United States Patent
Silverbrook et al.

(10) Patent No.: US 7,535,582 B1
(45) Date of Patent: May 19, 2009

(54) DIGITAL PHOTOGRAPHIC DUPLICATION SYSTEM WITH IMAGE QUALITY RESTORATION

(75) Inventors: Kia Silverbrook, Balmain (AU); Paul Lapstun, Rodd Point (AU); Simon Robert Walmsley, Epping (AU)

(73) Assignee: Silverbrook Research Pty Ltd, Balmain, New South Wales (AU)

(*) Notice: Subject to any disclaimer, the term of this patent is extended or adjusted under 35 U.S.C. 154(b) by 985 days.

(21) Appl. No.: 09/693,317

(22) Filed: Oct. 20, 2000

(51) Int. Cl.
*G06F 3/12* (2006.01)
*H04N 1/21* (2006.01)
*H04N 1/46* (2006.01)

(52) U.S. Cl. .................. 358/1.1; 358/474; 358/505; 358/302

(58) Field of Classification Search .................. 396/312; 714/752, 762; 358/505, 474, 302, 1.1, 1.11–1.19
See application file for complete search history.

(56) References Cited

U.S. PATENT DOCUMENTS

| | | | |
|---|---|---|---|
| 4,977,459 A | | 12/1990 | Ebinuma et al. |
| 5,547,501 A | * | 8/1996 | Maruyama et al. .......... 347/107 |
| 5,644,557 A | * | 7/1997 | Akamine et al. .............. 369/14 |
| 5,726,693 A | | 3/1998 | Sharma et al. |
| 5,771,245 A | * | 6/1998 | Zhang ........................ 714/762 |
| 5,896,403 A | | 4/1999 | Nagasaki et al. |
| 5,995,193 A | * | 11/1999 | Stephany et al. .............. 355/31 |
| 5,996,893 A | * | 12/1999 | Soscia .................... 235/462.01 |
| 6,094,279 A | * | 7/2000 | Soscia ......................... 358/1.9 |
| 6,095,566 A | * | 8/2000 | Yamamoto et al. ............. 283/75 |
| 6,102,505 A | * | 8/2000 | McIntyre et al. ............ 358/502 |
| 6,160,642 A | * | 12/2000 | Mui et al. .................... 358/498 |
| 6,304,345 B1 | * | 10/2001 | Patton et al. ................. 358/527 |
| 6,437,849 B1 | * | 8/2002 | DeClerck et al. .............. 355/18 |
| 6,603,864 B1 | * | 8/2003 | Matsunoshita .............. 382/100 |
| 6,636,332 B1 | * | 10/2003 | Soscia ........................ 358/401 |
| 6,644,764 B2 | * | 11/2003 | Stephens, Jr. .................. 347/3 |
| 6,894,794 B1 | * | 5/2005 | Patton et al. ............... 358/1.15 |

FOREIGN PATENT DOCUMENTS

| | | |
|---|---|---|
| EP | 974924 | 1/2000 |
| EP | 0974924 A | 1/2000 |
| JP | 07254038 | 10/1995 |
| JP | 08129634 | 5/1996 |
| JP | 11227367 | 8/1999 |
| JP | 2000-141788 | 5/2000 |
| WO | WO 99/04368 A | 1/1999 |

* cited by examiner

*Primary Examiner*—Edward L Coles
*Assistant Examiner*—Thomas J Lett

(57) ABSTRACT

An apparatus for printing out recovered image data from a photograph is disclosed. The data is recorded in infrared ink on top of the image itself in an encoded fault tolerant digital form enabling the image to be recovered notwithstanding damage to the photograph surface. The apparatus can print out the image after processing the data. If the data is stored then the image can be printed as many times as required. Alternatively, the photograph can be repeatedly passed through the scanner or reader the required number of times. In another form of the invention, the apparatus can also print out the image with the image data again recorded in infra-red ink using a printer which has the necessary number of ink jet nozzles to do so and the apparatus has the necessary processing capacity to process, compress, scramble and encode the data.

5 Claims, 5 Drawing Sheets

DIGITAL PHOTOGRAPHIC DUPLICATION SYSTEM WITH IMAGE QUALITY RESTORATION

FIELD OF THE INVENTION

The present invention relates to an apparatus for printing out or duplicating photographs from information recorded in infrared ink on the top of the photograph using an ink jet printing system.

CO-PENDING APPLICATIONS

Various methods, systems and apparatus relating to the present invention are disclosed in the following co-pending applications filed by the applicant or assignee of the present invention simultaneously with the present application:

| U.S. patent application Ser. No. |
| --- |
| 09/693,471 |
| 09/693,083 |
| 09/693,134 |
| 09/693,226 |
| 09/693,277 |

The disclosures of these co-pending applications are incorporated herein by reference.

Various methods, systems and apparatus relating to the present invention are disclosed in the following co-pending application filed by the applicant or assignee of the present invention on 10 Jul. 1998:

U.S. Ser. No. 09/112,781
U.S. Ser. No. 09/112,785
U.S. Ser. No. 09/112,824

The disclosures of these co-pending applications are incorporated herein by reference.

Various methods, systems and apparatus relating to the present invention are disclosed in the following co-pending applications filed by the applicant or assignee of the present invention on Jun. 30, 2000:

| | |
| --- | --- |
| USSN 09/608,308, | |
| USSN 09/608,779 | |
| USSN 09/607,987 | |
| USSN 09/608,776 | USSN 09/607,250 |
| USSN 09/607,991 | |

The disclosures of these co-pending applications is incorporated herein by reference.

BACKGROUND OF THE INVENTION

The applicant has previously described in U.S. Ser. No. 09/112,785 method and apparatus for printing out images using an ink jet printing system on a print media using a pagewidth ink jet printhead. The image can also be transformed by an image processing program loaded into the camera system for providing various effects on the image. The applicant has also disclosed recording data on the back of a printed photograph which can be used to reprint or recover the image which is printed on the front of the print media sheet. Such a printing system requires that there are two printheads one for printing the image itself and one for printing the data in an encoded fault tolerant form on the back of the photograph.

In applicant's U.S. Ser. No. 09/112,824, a method and apparatus for reproducing a photograph for example, printed using a camera system such as disclosed in U.S. Ser. No. 09/112,781 or U.S. Ser. No. 09/112,785 is disclosed.

In EP 354,581, a music score is encoded as a matrix of dots along a margin on a sheet and the data is read by a linear scanner. The scanner reads the width of the matrix which is much less than the width of the music score sheet. The amount of data encoded and therefore requiring processing is limited. Eight rows of binary data are used to record the music score in a 12 row matrix. The scanner is hand held and reading the data can result in errors if the angle of the linear scanner is too large such that the width of the scanner does not fully cover the width of the matrix. The invention disclosed in EP 354,581 has limited use and the disclosure does not suggest itself to use with a credit card size data card (e.g. 55 mm×85 mm) as disclosed in U.S. Ser. No. 09/112,781.

In the article, "Optical Sheet Memory System", Shinji Ohyama, Electronics and Communications in Japan, Part 2, Vol. 75 No. 4, 1992, pp 73-85, a system for recording a number of images and a duration of sound on a postcard size sheet using printed dots is disclosed. Postcards are mass-produced using a "precision printing method" the substance of which is not described. This system while similar to applicant's U.S. Ser. No. 09/112,785 or U.S. Ser. No. 09/112,824 does not provide for a portable on-demand print imaging system nor does it provide an output with both a viewable image and an encoded recoverable form thereof. The postcard is unusable without a data reader.

The applicant has disclosed in co-pending applications U.S. Ser. No. 09/693,471, U.S. Ser. No. 09/693,083 and U.S. Ser. No. 09/693,134 filed concurrently herewith, methods for recording data relating to an image captured by a camera system on top of or coincident with the printing of the image itself, that is, the image and the data are recorded on the same side and in the same area of the print media. Such a method requires a pagewidth ink jet printhead having at least four ink jet nozzles per printed "dot", three for printing the color image namely for printing with cyan, magenta and yellow inks and one for printing with an infra-red ink for printing the data corresponding to the image after it has been processed into an encoded fault tolerant digital form.

SUMMARY OF THE INVENTION

The present invention seeks to provide an apparatus for decoding the data printed on a photograph and printing out an image decoded from said data on a print media. The data printed on top of the image may be a digital representation of the image itself in an encoded fault tolerant digital form, or the image so encoded and an image processing program for producing a particular effect upon the image, or two images, one being the image per se and the other being the image as transformed by an image processing program. In the former case the image itself can be printed out notwithstanding substantial damage to the print media upon which the image and the encoded image data is recorded. In the second case the image can be printed out in its original form or as modified by the image processing program recorded along with that image data. In the third case either the image per se or the image as transformed can be printed out. The data which is recorded on the photographic image is encoded in such a way that even if substantial damage occurs to the surface of the photograph, the data will allow recovery of the image. This is possible by suitable duplication and redundancy in the data compression and scrambling of the data and encoding the data in a fault tolerant, for example a Reed-Solomon, code form. The size of the photograph is approximately 4"×6" (102 mm×152 mm). The data can be recorded on substantially the whole area of the photograph in a variety of formats, one of which is to record it as a series of data blocks (the so-called "alternative Artcard" format) and another of which is to record the data continuously over the data area as a series of columns (the so-called "Artcard" format) both of which are described in detail in U.S. Ser. No. 09/112,781 or U.S. Ser. No. 09/112,785. The former method of encoding, described in applicant's co-pending applications U.S. Ser. No. 09/693,471, U.S. Ser. No. 09/693,083, U.S. Ser. No. 09/693,134, would allow recovery of the image even if one third of the data blocks were damaged. Other sizes of print media are also disclosed for example a panoramic print which is approximately the same height but twice the width of the standard print 4"×6" described above.

By having the image data recorded on the image itself the need to have a separate photographic negative and to store it along with the photograph is avoided. Presently, the storage of image data in a digital form is on a computer system and is subject to the limited capacity of the hard drive, the ability to find the data and the risk of damage to the hard drive storing the data, the obsolescence of the hard drive, or the obsolescence of the image data format. These defects are avoided in the current arrangement whereby the data is recoverable if the photograph itself is available, if it has not suffered more than one third damage, that is approximately two thirds is available for processing.

It is an object of the present invention to provide for an apparatus of reading digital data printed on a photograph in infrared ink wherein the data is encoded image data from a camera system, the apparatus including a scanner means for scanning data in infrared printed on the photograph; means for advancing the print media through the scanning means; means for illuminating the print media with infrared radiation; means for processing data output from said scanner means including means for decoding said data; ink jet printer means for printing out the image derived from said decoded data on a print media attached to said ink jet printer means.

The encoded fault tolerant digital data may also be reprinted on top of the recovered or replicated image if the ink jet printhead has provisions for printing in the necessary number of colors, namely cyan, magenta, yellow and infrared. If the photograph is undamaged then a direct copying or replication of the infrared data and/or color image can be produced in the manner of the applicant's method and apparatus disclosed in the application U.S. Ser. No. 09/112,824. If the photograph is damaged then the full data would have to be recovered before being printed and, if required encoded again into its fault tolerant digital form for print out simultaneously with the image on the print media. Other versions of the image can also be printed if the apparatus is provided with means for reading an "Artcard" and for processing the data received therefrom in the manner as described in U.S. Ser. No. 09/112,781 and U.S. Ser. No. 09/112,785 by the applicant. In this instance, the Artcard reader may be the same device as the photograph scanning means or may be a separate integer. An Artcard as disclosed in said applications is of a credit card size approximately 55 mm×85 mm and the scanning means for scanning a photograph as required for the present invention would be wider to accommodate the 102 mm×152 mm (4"×6") size of the photograph. In that case, the scanner means may be provided with means for accommodating various width cards for example, for altering the size of the slot through which the Artcard or the photograph is to be inserted.

The print media used to print out the recovered or duplicated photograph is the same as the photograph itself namely approximately 102 mm×152 mm (4"×6"), although it is contemplated that the print media may be of a larger size such as to provide a panoramic print of the same height but approximately twice the width of the standard photograph. A panoramic print may require an image processing program to be employed using the appropriate Artcard for that purpose or the original photograph may have been a panoramic print with the encoded data including the necessary image processing program encoded therewith, for example as described in the applicant's application U.S. Ser. No. 09/693,083.

BRIEF DESCRIPTION OF THE DRAWINGS

Notwithstanding any other forms which may fall within the scope of the present invention, preferred forms of the invention will now be described, by way of example only, with reference to the accompanying drawings in which.

DESCRIPTION OF THE PREFERRED EMBODIMENT

Dots

The dots printed on the photograph are in infrared ink over a color image. Consequently a "data dot" is physically different from a "non-data dot". When the photograph is illuminated by an infrared source having complementary spectral properties to the absorption or response characteristics of the infrared (IR) ink the data appears as a monochrome display of "black" on "white" dots. The black dots correspond to dots were the IR ink is and has absorbed the IR illumination and "white" dots correspond to areas of the color image over which no IR ink has been printed and reflecting the IR illumination substantially unattenuated or only partially attenuated. Hereinafter the terms black and white as just defined will be used when referring to the IR ink dots recording data.

Data Card Reader

Figure 1:
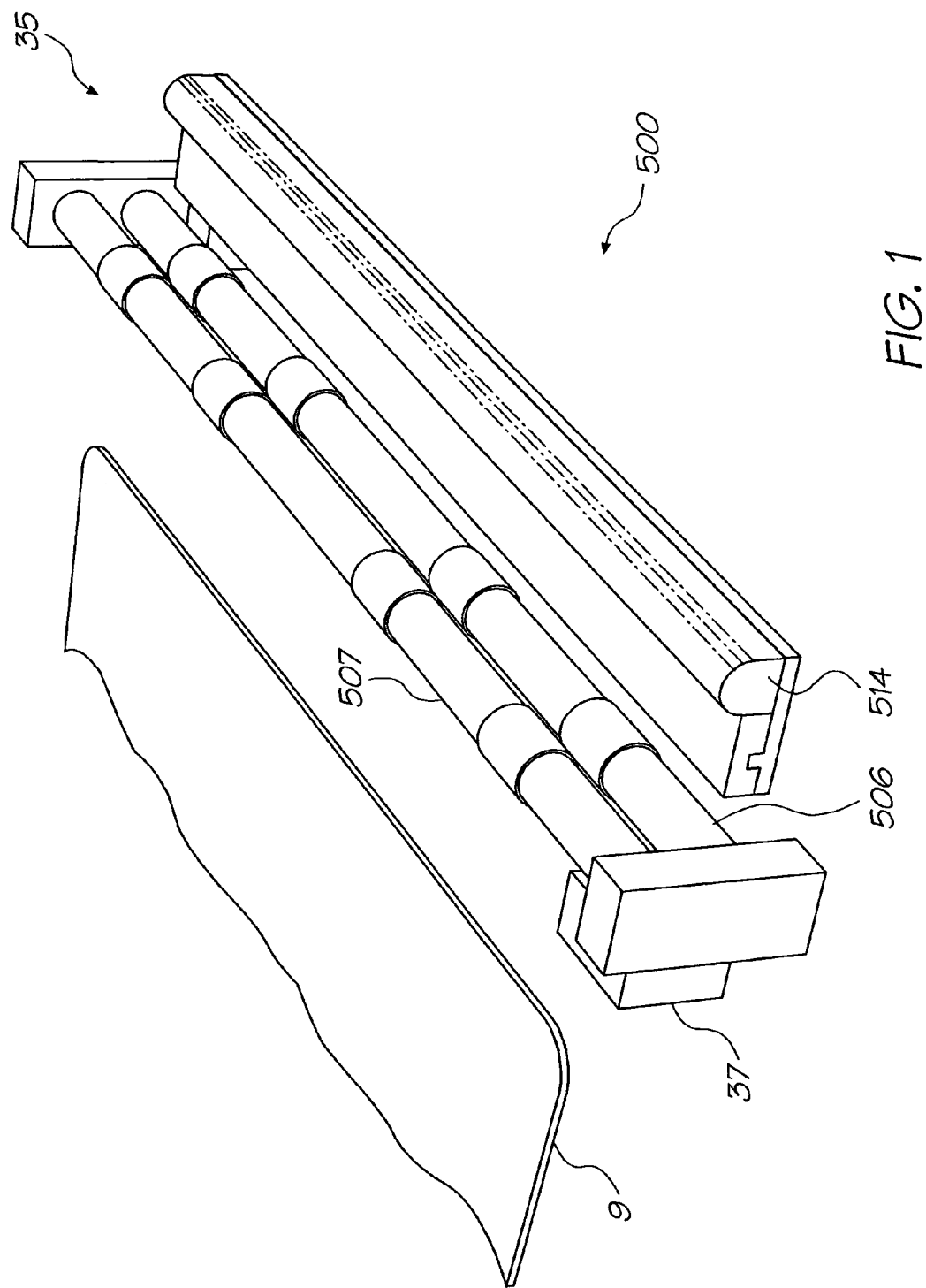
FIG. 1 illustrates one form of card reader according to the invention.
Figure 2:
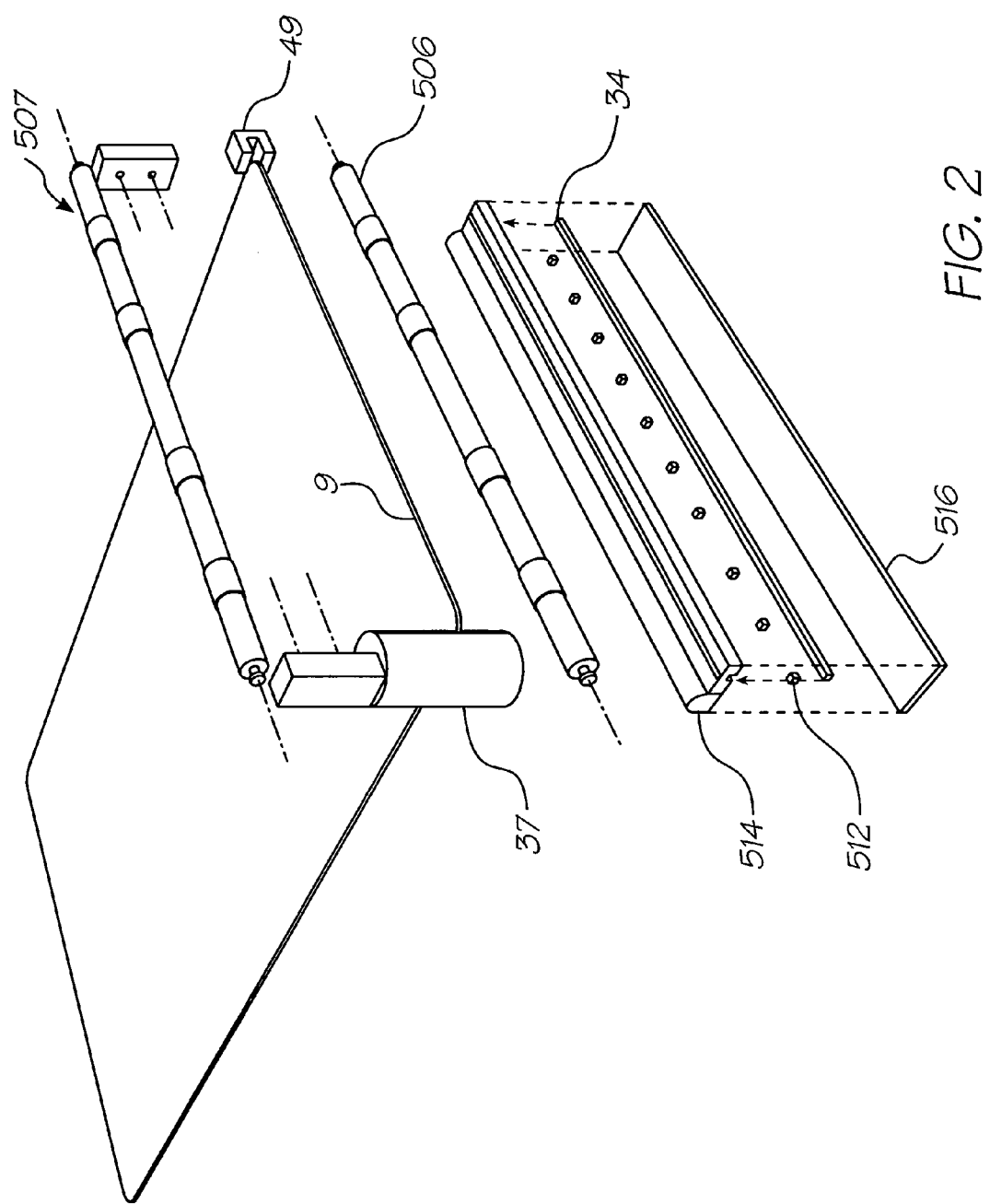
FIG. 2 illustrates an exploded view of FIG. 1.

FIG. 1, illustrates one form of card reader 500 which allows for the insertion of a photograph 9 for reading. FIG. 2 shows an exploded perspective of the reader of FIG. 1. The card reader is interconnected to a computer system and includes a CCD reading mechanism 35. The card reader includes pinch rollers 506, 507 for pinching an inserted photograph 9. One of the rollers e.g. 506 is driven by a motor 37 for the advancement of the photograph 9 between the two rollers 506 and 507 at a uniform speed. The photograph 9 is passed over a series of infrared (IR) LEDs 512 which are encased within an IR transparent mould 514 having a semi circular cross section. The cross section focuses the IR from the LEDs eg 512 onto the surface of the photograph 9 as it passes by the LEDs 512. From the surface it is reflected to a high resolution linear CCD 34 which is constructed to a resolution of approximately 4800 dpi. The CCD reader includes a bottom substrate 516 and IR transparent mould 514 providing a top substrate. In between the two substrates is inserted the linear CCD array 34 which comprises a thin long linear CCD array constructed by means of semi-conductor manufacturing processes.

The surface of the photograph 9 is encoded to the level of approximately 1600 dpi hence, the linear CCD 34 supersamples the photograph's surface with an approximately three times multiplier. The photograph 9 is further driven at a speed such that the linear CCD 34 is able to supersample in the direction of photograph movement at a rate of approximately 4800 readings per inch. The scanned CCD data is forwarded from the reader to processing unit 31 for processing. A sensor 49, which can comprise a light sensor acts to detect the presence of the photograph 9.

Figure 3:
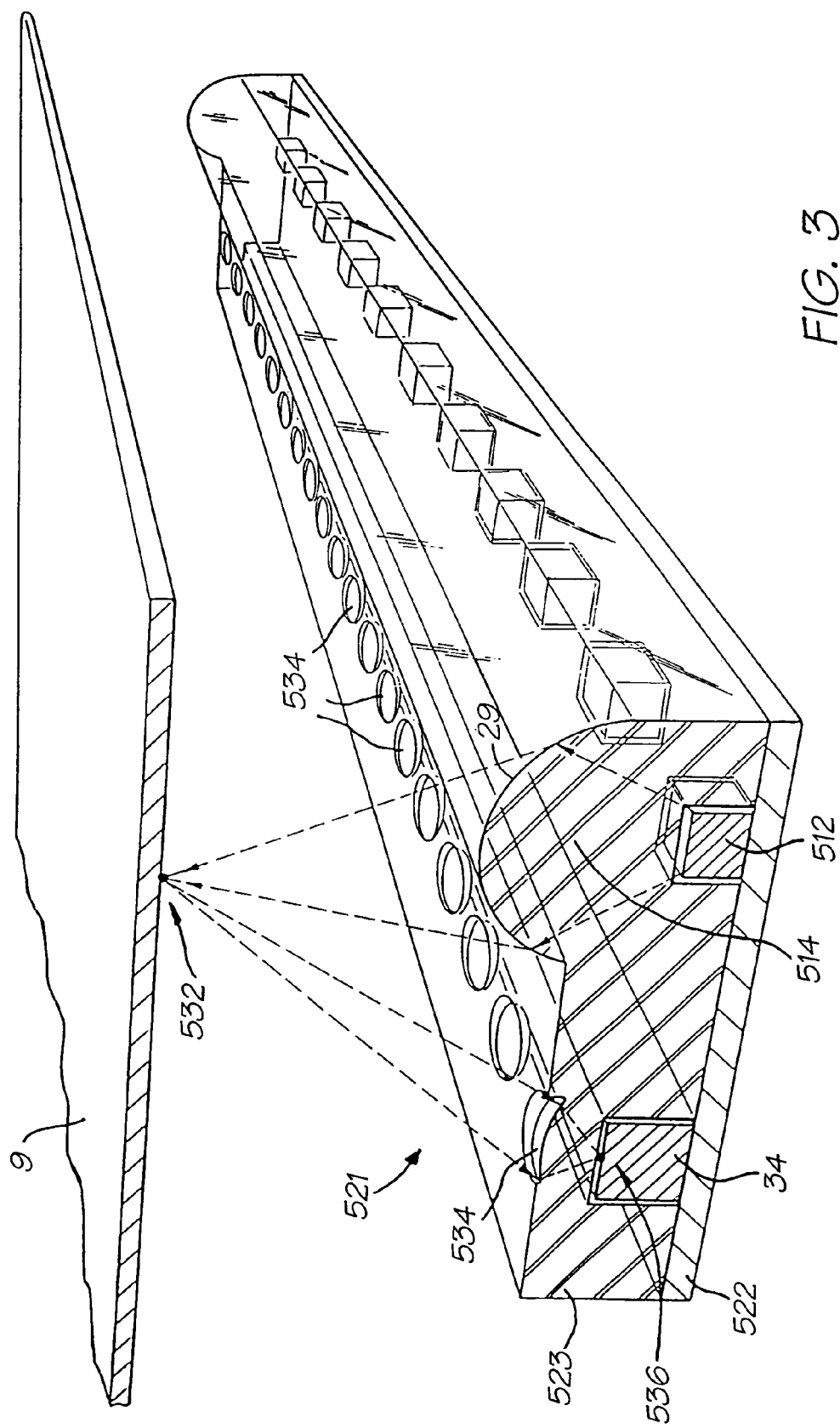
FIG. 3 illustrates a side perspective view, partly in section, of one form of construction of CCD reader unit.

Turning to FIG. 3, there is illustrated a side perspective view, partly in section, of an example construction of the CCD reader unit. The series of LEDs e.g. 512 are operated to emit infrared (IR) radiation when a photograph 9 is passing across the surface of the CCD reader 34. The emitted IR radiation is transmitted through a portion of the top substrate 523. The substrate includes a portion e.g. 29 having a curved circumference so as to focus IR radiation emitted from LED 512 to a point e.g. 532 on the surface of the photograph 9. The focused IR radiation is reflected from the point 532 towards the CCD array 34. A series of microlenses e.g. 534, shown in exaggerated form, are formed on the surface of the top substrate 523. The microlenses 534 act to focus IR radiation received across the surface to be focused down to a point 536 which corresponds to a point on the surface of the CCD reader 34 for sensing of IR radiation falling on the IR sensing area of the CCD array 34.

A number of refinements of the above arrangement are possible. For example, the sensing devices on the linear CCD 34 may be staggered. The corresponding microlenses 534 can also be correspondingly formed as to focus IR into a staggered series of spots so as to correspond to the staggered CCD sensors. The CCD array may only cover a part of the width of the photograph being scanned (for example, a half) and a microlens array or other optical arrangement may be utilized to enable radiation from the full width of the photograph to be collected for detection. Suitable linear CCD arrays sensitive to infrared radiation are those used in facsimile machines or flat bed scanners. For a description of the construction and operation of linear CCD devices, reference is made to a standard text such as in "CCD arrays, cameras and displays" by Gerald C Holst, published 1996 by SPIE Optical Engineering Press. Further, suitable sensor devices are regularly described in the IEEE Transactions on Consumer Electronics.

Figure 4:
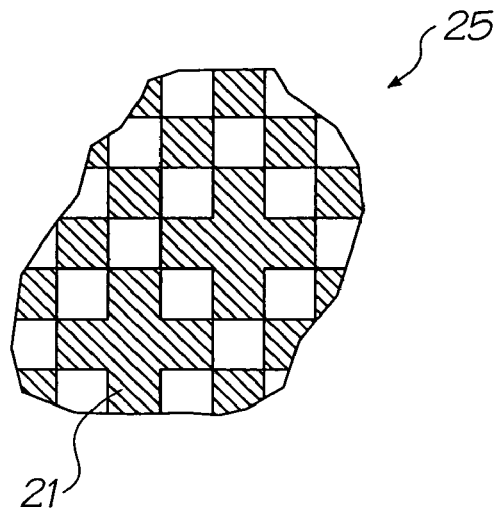
FIG. 4 illustrates a checkerboard pattern with which the data surface may be modulated.

To assist reading, the data surface area of the photograph 9 is modulated with a checkerboard pattern as shown with reference to FIG. 4. A portion of the data 25 is shown in schematic form and the data comprises an array of IR dots which is additionally modulated by a high frequency "checkerboard" pattern 21 added to the data so as to assist in sensing of the encoded data. Other forms of high frequency modulation may be possible however.

A printer is provided in combination with the scanner for printing out the image data on the photograph after it has been read and decoded. For example, the applicant's Artcard reader or an Artcam with an integral Artcard reader as disclosed in U.S. Ser. No. 09/112,785 modified to accommodate reading in the infra-red of a wider and longer card and to which print means can be removably attached can be used for these purposes.

A suitable printhead is disclosed in applicant's U.S. Ser. No. 09/608,308, U.S. Ser. No. 09/608,779, U.S. Ser. No. 09/607,987, U.S. Ser. No. 09/608,776, U.S. Ser. No. 09/607, 250, and U.S. Ser. No. 09/607,991 applications, which disclose a 6-ink ink jet pagewidth printhead for printing an A4 size page (210 mm×275 mm or 8"×11½"). In the current invention the photograph print media may be 4"×6" (102 mm×152 mm) requiring a printhead of approximately half the width as disclosed therein.

Reading Data from the CCD—General Considerations

In what follows, it is assumed that the data is encoded on a photograph using the so-called "Artcard" format as disclosed in applicant's U.S. Ser. No. 09/112,781 or U.S. Ser. No. 09/112,785 in a data area of 97 mm×147 mm for a 102 mm×152 mm photograph (4"×6") with 2.5 mm borders (0.1"). In this format the data area is continuous and bordered by targets at the leading and trailing edges of the data area and by other indicia along the top and bottom margins to ensure correct reading of the data notwithstanding up to 1° rotation of the photograph with respect to the linear CCD IR sensor's orientation. The data is scrambled and encoded using a Reed-Solomon algorithm or process. In addition, the data may be compressed before encoding and scrambling. The data may be image data from a camera system, image data and an image processing program, or two images, one the image as photographed and another an image as transformed by an image processing program such as described in applicant's co-pending applications U.S. Ser. No. 09/693,471, U.S. Ser. No. 09/693,083, U.S. Ser. No. 09/693,134.

Figure 5:
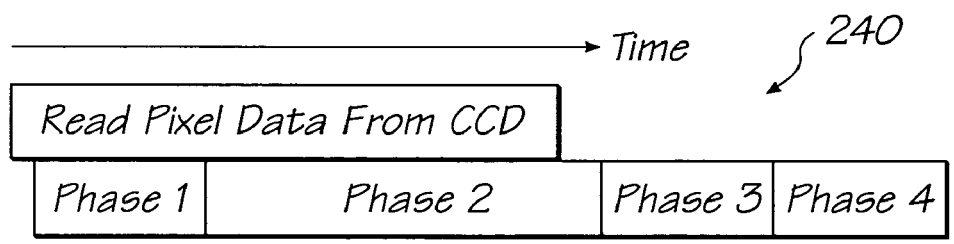
FIG. 5 illustrates the reading process.

As illustrated in FIG. 5, the reading process has 4 phases operated while the pixel data is read from the card. The phases are as follows:

| | |
|---|---|
| Phase 1. | Detect data area on photograph |
| Phase 2. | Detect bit pattern from photograph based on CCD pixels, and write as bytes. |
| Phase 3. | Descramble and XOR the byte-pattern |
| Phase 4. | Decode data (Reed-Solomon decode) |

The photograph 9 must be sampled at least double the printed resolution to satisfy Nyquist's Theorem. In practice it is better to sample at a higher rate than this. Preferably, the pixels are sampled at 3 times the resolution of a printed dot in each dimension, requiring 9 pixels to define a single dot. Thus if the resolution of the photograph 9 is 1600 dpi, and the resolution of the sensor 34 is 4800 dpi, then using a 100 mm width CCD image sensor (98.7 mm. is required to cover the width of the data area of 97 mm×147 mm with margins of 2.5 mm printed at 1600 dpi print resolution and allowing for up to a 1° rotation of a photograph of 4"×6" or 102 mm×152 mm) results in 18900 pixels per column (100*1600*3/25.4). Therefore if a photograph stores 8 MB of dot data (at 9 pixels per dot) then this entails 8 MB*8*9/18900=30,476 columns or approximately 30,500 columns. Of course if a dot is not exactly aligned with the sampling CCD the worst and most likely case is that a dot will be sensed over a 16 pixel area (4×4).

A photograph 9 may be slightly warped due to heat damage, slightly rotated (up to, say 1 degree) due to differences in insertion into a reader, and can have slight differences in true data rate due to fluctuations in the speed of the reader motor 37. These changes will cause columns of data from the card not to be read as corresponding columns of pixel data. A 1 degree rotation in the photograph 9 can cause the pixels from a column on the photograph to be read as pixels across approximately 305 columns.

Finally, the photograph 9 should be read in a reasonable amount of time with respect to the human operator. The data on the photograph covers most of the surface, so timing concerns can be limited to the data itself. A reading time of approximately 3 seconds is adequate.

If the photograph is loaded in 3 seconds, then all 30,500 columns of pixel data must be read from the CCD 34 in 3 seconds, i.e. 10,167 columns per second. Therefore the time available to read one column is 0.0000984 seconds. Pixel data can be written to a DRAM, for example of 8 Mbytes one column at a time, completely independently from any processes that are reading the pixel data.

The time to write one column of data to DRAM is reduced by using a number of cache lines, for example, 8 cache lines. If 4 lines were written out at one time, 4 banks of DRAM can be written to independently, and thus overlap latency reduced.

DRAM Size

The amount of memory required for reading and decoding of the encoded data is ideally minimized. The typical placement of a reader is in an embedded system where memory resources are limited, for example as a feature of an Artcam as described in U.S. Ser. No. 09/112,781 or U.S. Ser. No. 09/112,785. This is made more problematic by the effects of rotation as the more the photograph is rotated, the more scanlines are required to effectively recover original IR dots.

There is a trade-off between algorithmic complexity, user perceived delays, robustness, and memory usage. One of the simplest reader algorithms would be to simply scan the whole photograph and then to process the whole data without real-time constraints. Not only would this require huge reserves of memory, it would take longer than a reader algorithm that occurred concurrently with the reading process.

The actual amount of memory required for reading and decoding a photograph is twice the amount of space required to hold the encoded data, together with a small amount of scratch space (1-2 Mbyte).

Decoding the Data

A simple look at the data sizes shows the impossibility of fitting the process into, for example, 8 MB of memory for example, as used in the applicant's Artcard reader of U.S. Ser. No. 09/112,781 if the entire pixel data (560 MB if each bit is read as a 3×3 array) as read by the linear CCD 34 is kept. For this reason, the reading of the linear CCD, decoding of the bitmap, and the un-bitmap process should take place in real-time (while the photograph 9 is traveling past the linear CCD 34), and these processes must effectively work without having entire data stores available.

The unscrambling process requires two sets of 8 MB areas of memory since unscrambling cannot occur in place.

It is assumed here that the data was encoded using the Artcard format as described in U.S. Ser. No. 09/112,781 or U.S. Ser. No. 09/112,785 with a checkerboard modulation. In the Artcard format, the data is printed in a continuous data area the start and end of which is marked by targets, for example 16 targets for a card of 55 mm×85 mm, each target having a white dot in the centre of an array of 31×31 black dots with the data beginning 24 dots from that central dot. For a card of 4"×6" (102 mm×152 mm) size, 32 similar targets may be used. Alternatively, the data may have been recorded in the "alternative Artcard" format which is equally disclosed in U.S. Ser. No. 09/112,785; or in U.S. Ser. No. 09/693,471, U.S. Ser. No. 09/693,083, U.S. Ser. No. 09/693,134. In this format, data is arranged in data blocks having specific characteristics wherein the data blocks are locatable by a distinctive set of targets.

Figure 6:
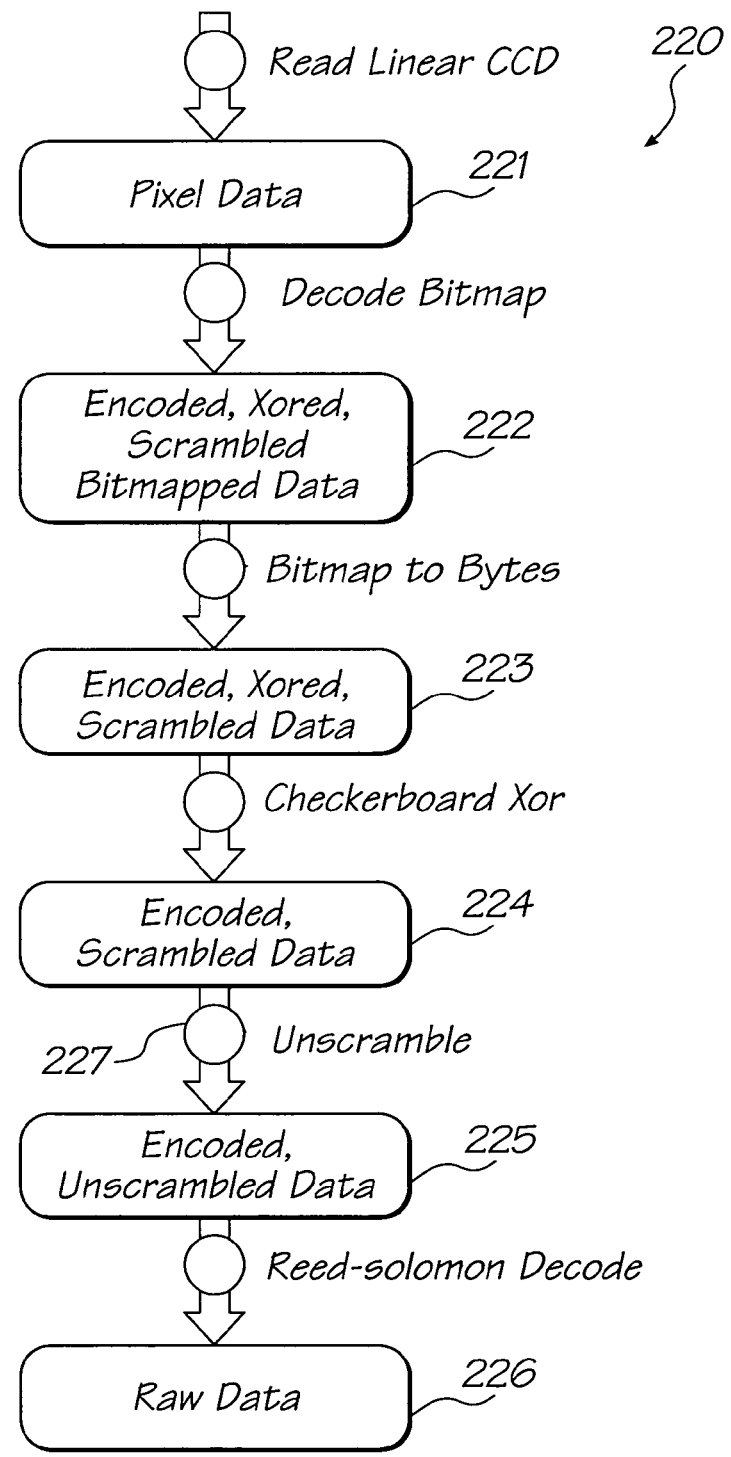
FIG. 6 illustrates the steps necessary to decode data read in from a photograph.

Turning now to FIG. 6, there is shown a flowchart 220 of the steps necessary to decode the data. These steps include reading in the photographic data 221, decoding the read data to produce corresponding encoded XORed scrambled bitmap data 223. Next a checkerboard XOR is applied to the data to produce encoded scrambled data 224. This data is then unscrambled 227 to produce data 225 before this data is subjected to Reed-Solomon decoding to produce the original raw data 226. Alternatively, unscrambling and XOR process can take place together, not requiring a separate pass of the data. Each of the above steps is discussed in detail in the applicant's applications U.S. Ser. No. 09/112,781 or U.S. Ser. No. 09/112,785. As noted previously with reference to FIG. 5, the process of scanning data therefore, has 4 phases, the first 2 of which are time-critical, and must take place while pixel data is being read from the CCD.

The four phases are described in more detail as follows.

Phase 1.

As the photograph 9 moves past the CCD 34 the start of the data area must be detected by robustly detecting special targets on the photograph to the left of the data area. If these cannot be detected, the photograph is rejected as invalid. The detection must occur in real-time, while the photograph 9 is moving past the CCD 34.

If necessary, rotation invariance can be provided. In this case, the targets, as described in applicant's U.S. Ser. No. 09/112,781 or U.S. Ser. No. 09/112,785, are repeated on the right side of the photograph, but relative to the bottom right corner instead of the top corner. In this way the targets end up in the correct orientation if the card is inserted the "wrong" way. Phase 3 below can be altered to detect the orientation of the data, and account for the potential rotation.

Phase 2.

Once the data area has been determined, the main read process begins, placing pixel data from the CCD into a 'data window', detecting bits from this window, assembling the detected bits into bytes, and constructing a byte-image in DRAM. This must all be done while the photograph is moving past the CCD.

Phase 3.

Once all the pixels have been read from the data area, the motor 37 can be stopped, and the byte image descrambled and XORed. Although not requiring real-time performance, the process should be fast enough not to annoy the human operator. The process must take 8 MB of scrambled bit-image and write the unscrambled/XORed bit-image to a separate 8 MB image.

Phase 4.

The final phase in the read process is the Reed-Solomon decoding process, where the 8 MB bit-image is decoded into a 4 MB valid image data area. Again, while not requiring real-time performance it is still necessary to decode quickly with regard to the human operator. If the decode process is valid, the card is marked as valid. If the decode failed, any duplicates of data in the bit-image are attempted to be decoded, a process that is repeated until success or until there are no more duplicate images of the data in the bit image.

The four phase process described requires 18 MB of DRAM. 8 MB is reserved for Phase 2 output, and 2 MB is reserved for scratch data during phases 1 and 2.

A description of the actual operation of each phase is provided in greater detail in U.S. Ser. No. 09/112,781 and U.S. Ser. No. 09/112,785 for a data card 55 mm×85 mm and storing 2 MBytes of data.

If the data was encoded and printed on the photograph, using the "alternative Artcard" format, such as described in U.S. Ser. No. 09/693,471, U.S. Ser. No. 09/693,083 or U.S. Ser. No. 09/693,134, then the procedure for reading and recovering the data is substantially as described in applicant's applications U.S. Ser. No. 09/112,781 or U.S. Ser. No. 09/112,785.

Print Out Decoded Data

Once the data has been recovered, the image, the image as transformed by the encoded image processing program or either of these, depending on whether the data recorded on the photograph is, for example, as disclosed in applicant's copending applications U.S. Ser. No. 09/693,471, U.S. Ser. No. 09/693,083 or U.S. Ser. No. 09/693,134, can be printed out using an ink jet printhead of the required characteristics. If only the image is to be printed a 3-ink ink jet printhead will suffice. If the image and the encoded data is to be printed then an at least 4-ink ink jet printhead would be necessary.

If the data can be stored either in the printer or in a RAM area of the processor which decodes the encoded data then the printer can be provided with means for enabling copies of the image to be printed as desired, for example dedicated switches or at least a numeric keypad. Alternatively, if a number of copies is required, the photograph may be passed repeatedly through the scanner.

The foregoing description has been limited to specific embodiments of this invention. It will be apparent, however, that variations and modifications may be made to the invention, with the attainment of some or all of the advantages of the invention. For example, it will be appreciated that the invention may be embodied in either hardware or software in a suitably programmed digital data processing system, both of which are readily accomplished by those of ordinary skill in the respective arts. Therefore, it is the object of the appended claims to cover all such variations and modifications as come within the true spirit and scope of the invention.

We claim:

1. An apparatus for reproducing a visible image depicted in a photograph, the photograph also carrying digitally encoded data printed in invisible ink, the digitally encoded data having pixel values for all pixels in the visible image, the apparatus comprising:

means for advancing the photograph through the scanner means;

an illuminating means for illuminating the photograph with invisible radiation;

a sensing means for receiving the invisible radiation illuminated on and reflected from the photograph by the illuminating means, the sensing means adapted to detect an interaction of the invisible radiation with the digitally encoded data carried on the photograph;

a top substrate in which the illuminating means is encased, the top substrate being transparent to infra red light and having a semi circular cross section in a portion thereof, the top substrate further having a elongated recess in another portion thereof, the elongated recess adapted to receive therein the sensing means;

an array of microlenses disposed on the top substrate, the array of microlenses being arranged on the top substrate to focus the radiation reflected from the photograph onto the sensing means;

means for processing data output from the scanner means, the means for processing data including means for decoding the plurality of copies of data relating to the visible image from the digitally encoded data scanned by the scanner means; and, inkjet printer means for receiving data from the means for processing data to print the visible image depicted in the photograph, the data used to print the visible image being generated using one of the plurality of copies of data relating to the visible image which the means for decoding correctly decoded from the digitally encoded data.

2. An apparatus as claimed in claim 1 wherein said ink jet printer means includes means for printing out on a print media attached to said ink jet printer means both the visible image depicted in the photograph and the digitally encoded data,.

3. An apparatus as claimed in claim 1 wherein said digitally encoded data is encoded in a fault tolerant digital form using a Reed-Solomon process and said means for processing and decoding said data includes means for processing said Reed-Solomon process.

4. An apparatus as claimed in claim 1 wherein said invisible ink is an infra-red absorbing ink, and wherein said invisible radiation is infra-red light.

5. An apparatus as claimed in claim 2 wherein said digitally encoded data is encoded in a fault tolerant digital form using a Reed-Solomon process and said means for processing data output from the scanner means includes means for processing said Reed-Solomon process.

* * * * *